(No Model.)

O. D. HARMON.
NUT LOCK.

No. 339,880. Patented Apr. 13, 1886.

Witnesses
Susie R. Seiler.
R. W. Bishop.

Inventor
Osceola D. Harmon
By his Attorneys
R. S. & A. P. Lacey

UNITED STATES PATENT OFFICE.

OSCEOLA D. HARMON, OF PHILADELPHIA, PENNSYLVANIA.

NUT-LOCK.

SPECIFICATION forming part of Letters Patent No. 339,880, dated April 13, 1886.

Application filed February 11, 1886. Serial No. 191,615. (No model.)

*To all whom it may concern:*

Be it known that I, OSCEOLA D. HARMON, a citizen of the United States, residing at Philadelphia, in the county of Philadelphia and State of Pennsylvania, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to that class of devices usually termed "nut-locks," and in common with such devices it seeks to provide a means for preventing the accidental loosening of a nut when the same is once screwed home; and it consists in the novel construction shown and in the combination of parts more fully hereinafter set forth, and specifically claimed.

Figure 1:
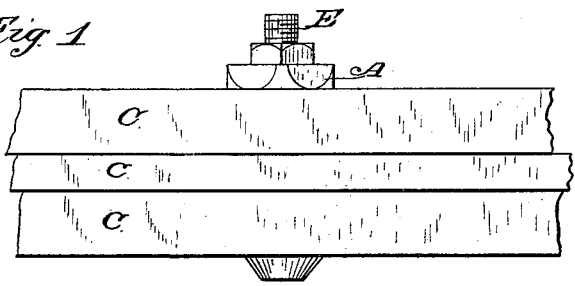
Figure 2:
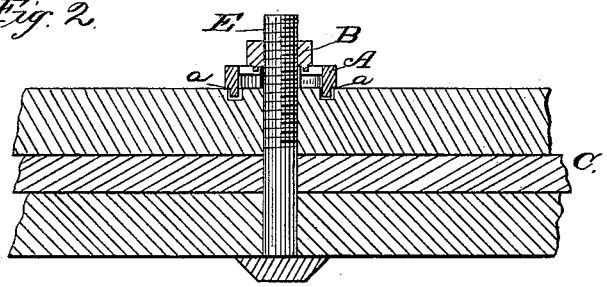
Figure 3:
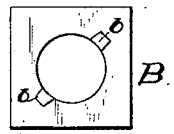
Figure 5:
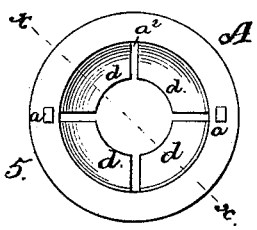
Figure 4:
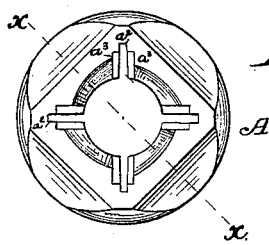
Figure 6:
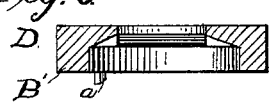

In the accompanying drawings, Figure 1 is a section of bars or timbers secured together by a bolt embodying my invention. Fig. 2 is a longitudinal section taken on a plane parallel with the bolt. Fig. 3 is a bottom plan view of a nut of my construction adapted to carry out my invention. Fig. 4 is a plan view of my improved washer. Fig. 5 is a bottom plan view of the same. Fig. 6 is a section on the line X X of Figs. 4 and 5.

In carrying out my invention I make use of a washer, A, of peculiar construction, and interpose the same between the nut B and the pieces C to be bolted together, said washer forming the locking medium between the parts. The washer may be of any desired shape and size, and is provided with lugs $a$ on the side adjacent the parts to be bolted. These lugs enter the face of the piece adjacent thereto, and prevent the washer following the movement of the nut.

In case the parts to be bolted are wood or similar soft material the lugs will become embedded therein as the nut is screwed home, as will be readily understood; but in case the parts are metal or similar rigid material the same must be provided with recesses $a'$, corresponding to the lugs $a$, which in the operation of the device rest therein.

The central portion of the washer is considerably reduced on its inner side, forming a fin or web, D, around the bolt-opening, which is divided in a number of sections or lips, $d$, by radial cuts, which may be of a width equal to the thickness of the lugs $b$ on the rear side of the nut, so as to permit the sections to spring up behind the lug and prevent the backward motion thereof. However, it may be found expedient to recess the lips on each side of the cut at $a^3$, to form sufficient space for the reception of the lug or projection $b$, and allow the lip $d$ to spring up behind it, as will be readily comprehended.

The lips may have their outer face flush with the plane of the washer, or they may be beveled from front to rear, calling that side the "front" which first engages the projection on the nut, and that the "rear" which is last to contact therewith. In the first instance, to the practical operation of the device, the forward side of the projections must be beveled, in order to cause a riding of the lip when screwing home the nut on the bolt E. In the latter case it is immaterial whether the lug on the nut is beveled or not, the inclination of the upper face of the spring-lips performing the function of allowing the progressive movement of the nut.

In practice the whole strain comes upon the solid rim B' of the washer, the spring-lips being used simply as yielding stops to engage the projections on the nut and prevent its accidental retrograde movement when once screwed home.

In appearance there is no departure from the usual form of nut and washer, and each of the parts may be made at a single casting and placed on the market ready for use, the nut and washer being made in pairs.

Having thus described my invention, what I claim, and desire to secure by Letters Patent, is—

1. The combination, with a nut having a projection on its rear side, of a washer having locking-lugs and a reduced central portion divided into sections, leaving a space between each two sections for the reception of the projection on the nut, substantially as specified.

2. The combination, with a nut having a projection, of a washer having its central portion reduced and divided to form spring-sections, which latter have their upper face inclined from front to rear, substantially as shown, and for the purpose described.

In testimony whereof I affix my signature in presence of two witnesses.

OSCEOLA D. HARMON.

Witnesses:
    THOS. M. SHELMIN,
    WM. T. FITZGERALD.